Nov. 20, 1962 R. J. KUTZLER 3,064,371
CONTROL APPARATUS FOR EARTH MOVING EQUIPMENT
Filed Dec. 30, 1959 2 Sheets-Sheet 1
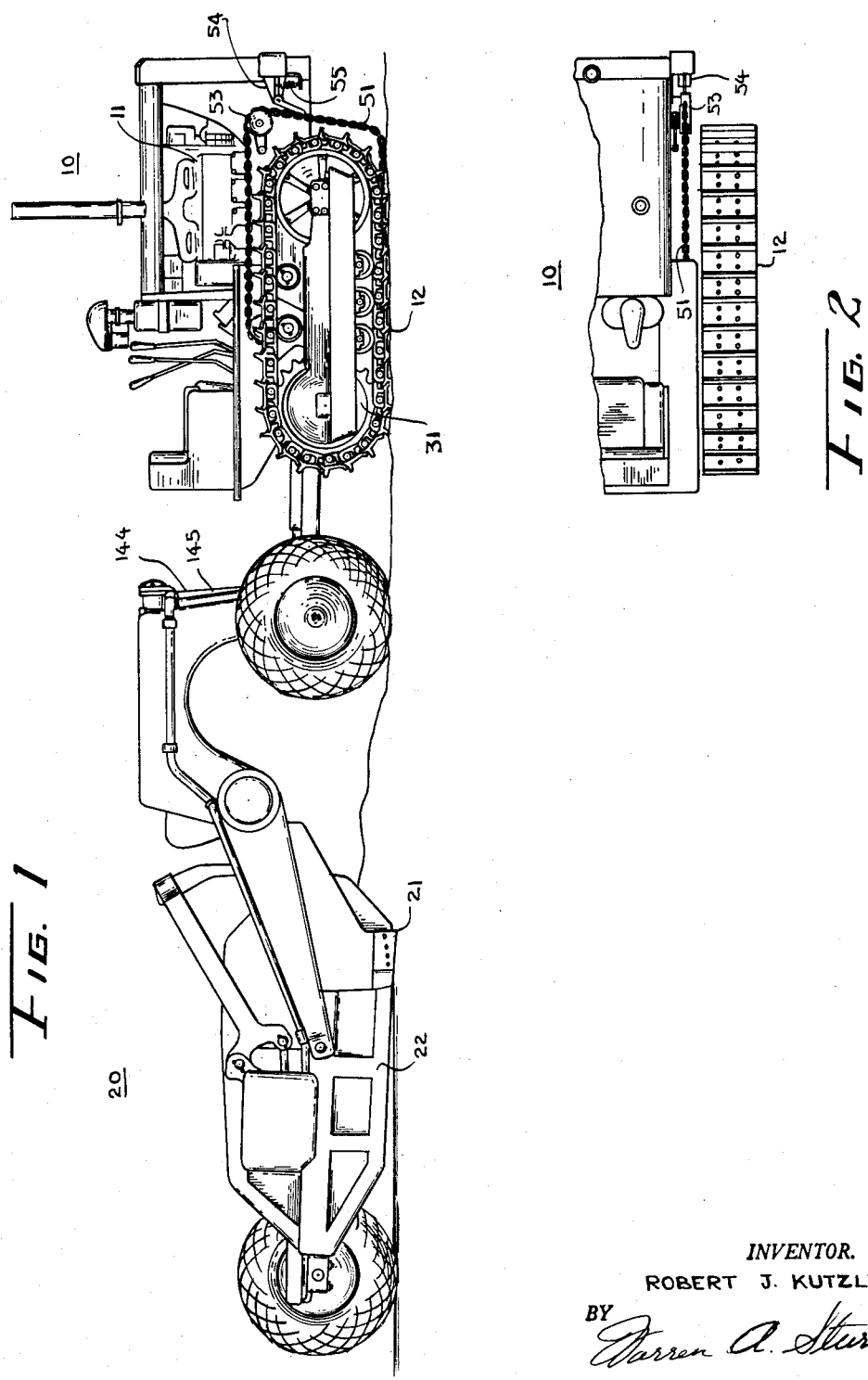
INVENTOR.
ROBERT J. KUTZLER
BY
ATTORNEY Nov. 20, 1962 R. J. KUTZLER 3,064,371
CONTROL APPARATUS FOR EARTH MOVING EQUIPMENT
Filed Dec. 30, 1959 2 Sheets-Sheet 2

INVENTOR.
ROBERT J. KUTZLER
BY
ATTORNEY

United States Patent Office 3,064,371
Patented Nov. 20, 1962

3,064,371
CONTROL APPARATUS FOR EARTH MOVING EQUIPMENT
Robert J. Kutzler, St. Louis Park, Minn., assignor to Minneapolis-Honeywell Regulator Company, Minneapolis, Minn., a corporation of Delaware
Filed Dec. 30, 1959, Ser. No. 862,931
4 Claims. (Cl. 37—126)

This invention relates generally to the field of earth working and is more particularly directed to apparatus for automatically controlling the operation of earth working equipment so as to provide maximum efficiency in the utilization of such equipment.

As indicated by the present state of the art in the field of earth working, there has been little, if any, effort devoted toward obtaining maximum utilization of any given piece of earth working equipment. There has been some effort directed toward automatic control of earth working equipment in the sense that mechanisms have been developed to relieve an operator of much of the mechanical effort previously required for the operation of such equipment. Some further work has been attempted along the lines of providing a form of stabilization and positional control of an earth working instrumentality which provide an increase in accuracy of operation rather than obtaining an increase in efficiency of operation.

In my invention, I provide control apparatus that may be responsive to the output r.p.m. of a driving means for earth working equipment and also may be responsive to slippage of tractive means on such earth working equipment to control either or both of these phenomena by altering the load imposed by the movement of an earth working instrumentality that is utilized in conjunction with the earth working equipment. For instance, the torque output of a given motor working under a load, as might be used on an earth working equipment, may be represented by a curve that approaches a maximum from a lower value and after going through the maximum value rapidly falls off to a lower value, plotting torque versus r.p.m. of the engine. By controlling the load imposed by the earth working instrumentality so that maximum torque output of the motor is utilized at all times, a maximum efficiency of operation is obtained. Further, dependent upon the tractive means utilized in the earth working equipment, it has been determined that some amount of slippage between the tractive means and the earth upon which the earth working equipment is operating, results in a higher efficiency of operation. This, of course, is also dependent upon the nature of the material of the earth that is to be worked upon, and in a manner not unlike automatic control of the load imposed by the earth working instrumentality described for the maximum efficiency of operation with respect to torque output, the equipment may be controlled to provide maximum efficiency of operation. In certain instances, it is desirable to utilize a combination of the control responsive to torque output and to slippage to control the operation of the earth working equipment by varying the load imposed by the earth working instrumentality. By now, it should be apparent to one skilled in the art that my invention will provide the maximum and economical use of earth working equipment in that more work may be done in a given unit of time and the equipment itself will provide a longer useful life.

It is therefore an object of my invention to provide control apparatus for controlling the operation of earth working equipment in accordance with operating parameters determined by the character of such equipment so as to provide maximum utilization of such equipment and a maximum in economy of operation.

It is a further object of my invention to provide control apparatus for controlling operation of earth working equipment that will enable a relatively unskilled operator to accomplish a maximum amount of work in a given time and prevent the operation of such equipment in a manner that may be detrimental to its normal life.

It is another object of my invention to provide control apparatus to control the operation of earth working equipment in accordance with a signal derived from a comparison of the actual velocity of such equipment and the velocity of its tractive means, and/or in accordance with a signal derived from a comparison of the r.p.m. of the motive means, or power plant, and a desired r.p.m. indicative of maximum output torque.

These and other objects of my invention will become apparent upon the reading of the appended specification, claims and drawing in which:

FIGURE 1 is a side view drawing of one form of earth working equipment which may utilize the principles of my invention;

FIGURE 2 is a top view of one side of the power plant and tractive means of the earth working equipment;

Figure 3:
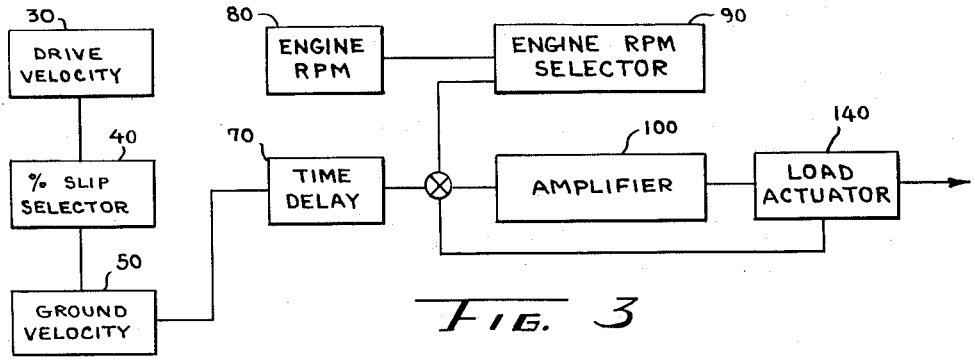
FIGURE 3 is a block diagram illustrating one form of a system utilizing the principles of my invention.

Referring now to FIGURE 1, there is shown a piece of earth working equipment in the form of a scraper 20, which is a familiar machine utilized to move earth from one location to another and may be characterized by the fact that it is self-loading when propelled, or drawn, by a motor vehicle across an area of earth to be removed when a cutting edge 21 is placed in contact with the earth. When propelled in a forward direction, the body 22 becomes filled with earth operated upon by the cutting edge 21. A motor vehicle 10, shown in form of a crawler type tractor having a motive means, or power plant, 11 and tractive means 12 is shown connected to propel, or draw, the scraper across an area to be operated upon through a draw bar connection. The power plant 11, may be placed in driving relationship to the tractive means 12 through suitable transmission arrangements to a sprocket 31 that is utilized to drive the track 12. Also provided on the motor vehicle, not shown, is a source of hydraulic fluid under pressure that may be supplied to hydraulic cylinders utilized to actuate the cutting edge 21 of the scraper 20 through hydraulic cylinders that are connected for operation from suitable control valves and from tthe source of hydraulic fluid under pressure through conduits 144 and 145. Also shown mounted on the motor vehicle are portions of apparatus for providing a signal indicative of the velocity of the motor vehicle with respect to the ground over which it is moving. This apparatus includes an endless flexible loop, shown as a chain 51, an idler pulley 52, a drive pulley 53 and a position sensing arm 54 that is spring biased against the forward hanging portion of the endless loop, or chain 51. The operation of the velocity sensing apparatus will be described below.

FIGURE 2 is a top view of the side of the motor vehicle, or tractor 10 showing the relative placement of the velocity sensing apparatus in relation to the motor vehicle and like elements are provided with like reference characters.

FIGURE 3 contains a block diagram illustrating a system that may be utilized in the earth working equipment shown in FIGURE 1 and includes a load actuator 140 which, in combination with amplifier 100 provides a servo mechanism to position the earth working instrumentality of a piece of earth working equipment in accordance with signals provided from sources of signal responsive to the r.p.m. of the power plant of the earth working equipment and to the slippage occurring between the tractive means and the ground. The source of signal responsive to engine r.p.m. may be a means, 80, for supplying an electrical signal proportional to the revolutions per minute of the power plant and, an engine revolutions per minute selector 90 and means for providing a summation of the two signals to provide a signal proportional to the deviation of the actual r.p.m. of the power plant from a desired value or level. A source of signal proportional to the slippage of a tractive means may comprise a source of electrical signal, 30, proportional to the velocity of the drive, or tractive means, a source of signal, 50, proportional to the ground velocity of the motor vehicle, and a further source of signal, 40, proportional to the predetermined desired slippage of a tractive means. All of these last named signals may be summed to provide a slippage signal that is proportional to deviations in slippage of the tractive means from a predetermined desired level, or value. The r.p.m. signal and slippage signals are summed at the input of an amplifier forming a portion of the servo mechanism utilized to position the cutting edge of the earth moving instrumentality to thereby vary the load in accordance with one or the other or both of the control signals. A time delay 70 may be interposed between the source of signal proportional to slippage and the servo mechanism utilized to vary the load to prevent operation of the servo mechanism for short term transients as might be occasioned by the character of the earth to be worked on or by the short term transient brought about by the turning of the motor vehicle. The operation of FIGURE 3 may be considered with FIGURE 4 to be described below.

Figure 4:
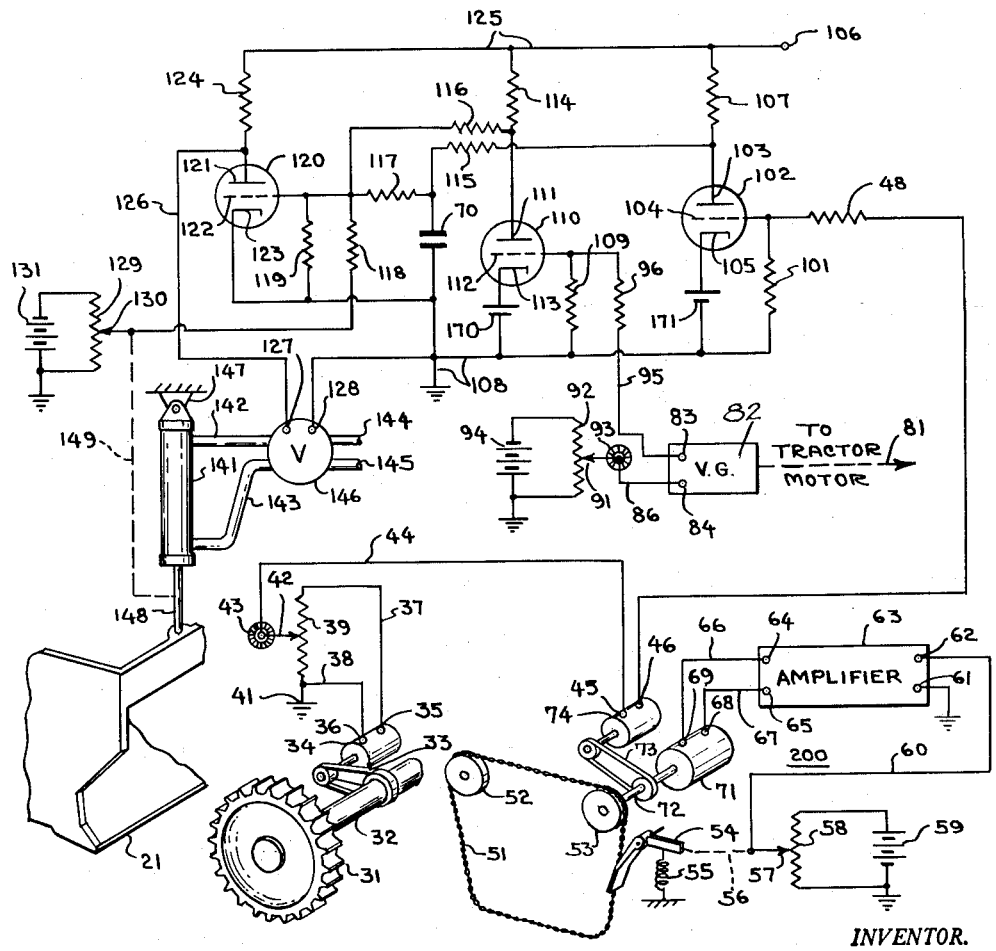
FIGURE 4 is a detailed schematic diagram illustrating a system utilizing the principles of my invention as may be applied to the earth working equipment of FIGURE 1.

FIGURE 4 is a schematic and diagrammatic showing of the operation of the entire control system as applied to earth moving equipment of the type shown in FIGURE 1. An apparatus for providing a signal proportional to the velocity of the earth working equipment relative to ground is shown generally by the reference character 200. The velocity sensing apparatus includes an endless loop of flexible material that may be carried by a motor vehicle, as noted in FIGURE 1, by providing an idler pulley 52 and a driving pulley 53. An arm 54, biased against the forward hanging portion of the endless loop of flexible material 51 by a bias spring 55 is utilized to sense the position of the hanging portion of flexible loop 51. Arm 54 is drivingly connected to the wiper 57 of potentiometer 58 through a driving means 56. Potentiometer 58 is energized by a battery 59 and the output of potentiometer 58 occurring between a ground terminal and wiper 57 is supplied to an input terminal 62 on amplifier 63. A further input terminal 61 and amplifier 63 is connected to ground. Amplifier 63 also has output terminals 64 and 65 connected to terminals 68 and 69 on the motor driving means 71 through leads 66 and 67 respectively. The output shaft of motor means 71 is connected to drive the drive pulley 53 at a speed such that will provide movement of the loop of flexible material, 51, at a speed the same as the velocity of the vehicle with respect to the ground over which it is traveling. A velocity generator 74 is shown connected to be driven from the output shaft 72 of motor means 71 through a belt 73. Velocity generator 74 is provided with output terminals 45 and 46 for supplying a signal that is proportional to the velocity of the motor vehicle with respect to the ground over which it is traveling. It may be noted that the forwardly hanging portion of the loop of flexible material, 51, will tend to assume a particular attitude, with respect to vertical, when the loop of flexible material is being driven at the same velocity as that of the motor vehicle upon which it is carried. The arm 54 is responsive to variations in this attitude to apply a control signal to amplifier 63 to vary the speed of the motor means 71 to provide a control of the driving speed, and thereby the velocity of the loop of flexible material 51.

A signal proportional to the velocity of the tractive means of the motor vehicle may be obtained from an axle member 32 that is utilized to drive a sprocket means 31 that in turn drives the tractive means, or track, 12, upon the motor vehicle. A velocity generator 34 having output terminals 36 and 35 is shown connected to the axle 32 through a belt, or driving means, 33. The output of the velocity generator 34 is applied to the extremities of the potentiometer 39 through leads 37 and 38. Lead 38 is provided with a connection to ground. Potentiometer wiper 42 of potentiometer 39 is provided with a knob 43 for manual adjustment and is further connected to output terminal 45 of velocity generator 74. This provides a summing arrangement for the signals proportional to drive velocity and actual velocity that may be adjusted to provide a signal output proportional to the degree of slippage of the tractive means 12 of the motor vehicle. The summation of the two signals appears at output terminal 46 of velocity generator 74 and is applied to a grid 104 of preamplifier tube 102 through resistor 48. Grid 104 is also connected to a ground lead 108 through resistor 101. Plate 103 of preamplifier tube 102 is connected to a source of energizing potential through resistor 107 and lead 125 which is connected to terminal 106. Cathode 105 of preamplifier tube 102 is connected to ground lead 108 through battery 171.

A source of signal proportional to deviations of the r.p.m. of the power plant of the motor vehicle is provided through the operation of a velocity generator 82, having output terminals 83 and 84, and is connected to be driven from the power plant of the motor vehicle through a driving means 81. Output terminal 84 is connected to potentiometer wiper 91 through lead 86. Potentiometer winding 92 is energized from a battery 94, one terminal of which may be grounded. Potentiometer wiper 91 is provided with a means for adjustment relative to potentiometer winding 92 through an adjusting knob 93. The signal appearing at output terminal 83 is the summation of the signals applied by the velocity generator 82 and a portion of the voltage supplied by battery 94 to potentiometer winding 92 and represents the signal that is proportional to deviations of the r.p.m. of the power plant from a desired value as determined by the relative position of wiper 91 with respect to potentiometer winding 92. The signal is applied to a preamplifier tube 110 through a lead 95, connected to velocity generator 82 and potentiometer 91, and through a resistor 96 to grid 112. Grid 112 is also connected to a ground lead 108 through resistor 109. The plate 111 of tube 110 is connected to be energized from a source of potential 106 through lead 125 and resistor 114. The cathode 113 is connected to ground lead 108 through battery 170.

The output of slip signal preamplifier tube 102 is connected to grid 122 of amplifier tube 120 through resistor 115 and resistor 117. A time delay capacitor 70 is connected between the junction of resistors 115 and 117 and ground lead 108. The output of r.p.m. signal preamplifier tube 110 is connected to grid 122 of amplifier tube 120 through resistor 116. A further resistor, 119, is connected between grid 122 and ground lead 108. The plate 121 of tube 120 is connected to the source of energizing potential 106 through resistor 124 and lead 125. Cathode 123 of tube 120 is directly connected to ground lead 108. The output of amplifier tube 120 is applied to terminal 127 on hydraulic control valve 146 through lead 126. A further terminal, 128, on hydraulic control valve 146 is connected to ground lead 108. The hydraulic control valve 146 is connected to control the operation of hydraulic cylinder 141 through conduits 142 and 143 to position the ram 148 in accordance with the control signals applied from the output of amplifier tube 120. Valve 146 may be connected to a suitable source of hydraulic fluid under pressure through conduits 144 and 145. Hydraulic cylinder 141 is securely fastened to the frame of the vehicle 20 through a mounting means shown generally by reference character 147 and the ram 148 of hydraulic cylinder 141 is securely affixed to the box member 22 which in turn carries the cutting edge of the earth working instrumentality 21 and is adapted to provide positioning of earth working instrumentality 21 relative to the frame of vehicle 20. A positional feedback signal is obtained through a driving means 149, connected to the ram 148 of hydraulic cylinder 141 and to the wiper 130 on potentiometer 129. Potentiometer 129 is energized from a battery 131 and a feeback signal thereby obtained is connected to grid 122 of amplifier tube 120 through resistor 118.

*Operation of FIGURE 4*

In utilizing the apparatus of my invention, the potentiometer wiper 91 of potentiometer 92 may be manually adjusted through the utilization of knob 93 for positioning potentiometer 91 at a position on potentiometer winding 92 such that the voltage appearing thereacross will be balanced by the output of velocity generator 82 when the velocity, or r.p.m., of the power plant, or tractor motor, is such that maximum torque output is provided. The potentiometer wiper 42 on potentiometer 39 may be initially manually positioned through the use of knob 43 so that the output signal selected thereby from the velocity generator 35 that is driven by the tractive means will be balanced by the output signal of velocity generator 74, that is driven by the velocity indicating apparatus, so that when the relative percentage slippage is a predetermined value, the signal from velocity generator 35, as selected by potentiometer wiper 42 will be balanced out by the signal from velocity generator 74. The settings of potentiometer wipers 42 and 91 are determined by the characteristics of the equipments to be utilized. The exact settings being determined by phenomena including terrain, nature of material being worked upon, characteristics of the earth working equipment, and economic factors relating to time and durability of the equipment.

Assuming now that the earth working equipment is in operation, and that the r.p.m. signal applied to the input of preamplifier 110 and the slip signal applied to the input of preamplifier 102 are such to indicate that there is no deviation in r.p.m. or slippage from the desired predetermined value, the input to amplifier 120 will be of a particular magnitude and thereby the output of amplifier 120 will be of a particular amplitude, or level in response thereto. The hydraulic control valve 146 will be responsive to this output to control the position of ram 148 of hydraulic cylinder 141 to a position that will provide feedback from potentiometer wiper 130 to the input of amplifier 120 to balance out the voltage at that point and the system will be in equilibrium wtih the cutting edge 21 positioned so that the load imposed thereby on the motor vehicle is of the desired value. Should this load vary, as might be occasioned by a deviation in the general character of the earth being worked upon, one or the other or both the r.p.m. output and slippage will vary in one direction or another. In which case the inputs to preamplifier tubes 102 and 110 may vary and accordingly the output of amplifier tube 120 will cause the hydraulic control valve 146 to provide operation of hydraulic cylinder 141 to reposition the cutting edge 21 of the earth moving instrumentality such that the system will regain its equilibrium to operate in accordance with the predetermined parameters of operation and thereby maintain the desired maximum efficiency.

It may be noted that the example shown in FIGURE 4, as described above, provides operation of the system that is linear with respect to both the slippage and r.p.m. signals in that each affects the load on the earth moving equipment in equal amounts. This is determined by the relative bias applied to the preamplifiers 102 and 110 through batteries 171 and 170 respectively and the relative ratios between the signals applied to the preamplifiers as determined by resistors 48 and 101 and 96 and 109 respectively. It will be seen that the gain of the preamplifiers, as determined by their input resistors, determines the relative effect of the signals and the value of the bias from batteries 171 and 170 affects the cut-off or saturation point of the preamplifiers for a predetermined signal input. By the selection of suitable values for these components, the operation of the system may be adjusted, for instance, so that one or the other input signals may predominate. As a specific example, the bias on preamplifier tube 110 may be adjusted so that an input signal indicative of an r.p.m. higher than a predetermined value will have no effect on its output while the bias on preamplifier tube 102 may be adjusted so that the output will vary in accordance with deviations of slippage signal above and below the predetermined value. In this example, the slippage signal becomes predominate whenever the engine r.p.m. is above the predetermined value because, as stated above, the bias is adjusted to allow preamplifier tube 110 to cut off when the r.p.m. signal is above its predetermined value.

It may be apparent to those skilled in the art that the form of the apparatus utilized for the control system in the embodiment shown in the drawings may be substantially changed without deviating from the principles of my invention and it is the intent that this invention be limited only by the scope of the appended claims.

I claim:

1. Apparatus for sensing the relative velocity of a vehicle with respect to the surface over which it is moving, comprising; an endless loop of flexible material adapted to be carried on the vehicle, drive means carried by the vehicle supporting said loop and spaced from the surface over which the vehicle is moving so that said loop is disposed vertically with the lower portion of it contacting the surface over which the vehicle is moving, the upper portion of it engages said drive means, and an intermediate portion extends generally vertically from said drive means to said lower portion, and means operatively associated with said intermediate portion to sense the vertical attitude thereof, said last named means including means to control the speed of said drive means and thereby cause said loop to move at the same velocity as the velocity of the vehicle.

2. In a control apparatus; a motor vehicle including motor means and tractive means connected to said motor means; an earth working instrumentality; signal responsive motor control means having an input and having an output connected in controlling relation to said earth working instrumentality to variably position said earth working instrumentality; a first source of signal indicative of the r.p.m. of said motor means; a second source of signal indicative of the relative velocities of said tractive means and said vehicle; and means connecting said first and second sources of signal in controlling relation to the input of said signal responsive motor control means to thereby control the load on said motor as the position of said earth working instrumentality is varied by the output of said signal responsive motor control means, to maintain a predetermined slip of said tractive means, and to override the control of said slip to then maintain a predetermined r.p.m. of said motor means when to maintain said predetermined slip would result in a deviation in said r.p.m.

3. In a control system for a motor driven earth moving vehicle including means to control the loading of the vehicle motor to thus maintain a desired slippage of the vehicle, and to override such slippage control when to maintain the desired slippage would result in a deviation in motor speed from a predetermined level; a motor driven vehicle;

variable load means for loading said vehicle; said load means comprising an earth moving instrumentality mounted for movement relative to said vehicle to thus provide variable loading of said vehicle; a first signal source having a first output indicative of motor speed of said vehicle; a second signal source having a second output indicative of slippage of said vehicle; control means having an input and having an output connected to control said variable load means; and means connecting said first and second outputs to the input of said control means to control said variable load means, said second signal being effective to maintain a predetermined slippage and said first signal being effective to override the effect of said second signal to reduce said loading when necessary to maintain a predetermined motor speed.

4. In apparatus for controlling a vehicle powering an earth working instrumentality; a motor driven vehicle including motor means and tractive means connected to be driven by said motor means; an earth working instrumentality; signal responsive motor control means, said motor control means having two inputs and having an output adapted to variably position said earth working instrumentality relative to said vehicle to thereby variably control the load applied to said motor means; a first signal source having an output indicative of the speed of said motor means; a second signal source having an output indicative of vehicle speed; a third signal source having an output indicative of the speed of said tractive means; means connecting the respective outputs of said second and third signal sources in controlling relationship to a first of said inputs of said motor control means so that the position of said earth working instrumentality is controlled to maintain a predetermined slippage of said tractive means; and means connecting the output of said first signal source to a second of said inputs of said motor control means to reset the position of said earth working instrumentality to maintain a predetermined motor speed by overriding the effects of said second and third signal sources.

References Cited in the file of this patent

UNITED STATES PATENTS

| | | |
|---|---|---|
| 1,536,327 | Cartlidge | May 5, 1925 |
| 2,347,882 | Choate et al. | May 2, 1944 |
| 2,654,301 | Bohmker | Oct. 6, 1953 |
| 2,674,332 | Ovshinsky | Apr. 6, 1954 |
| 2,711,230 | Wilson | June 21, 1955 |
| 2,842,039 | Swingle | July 8, 1958 |
| 2,918,154 | Scherenberg et al. | Dec. 22, 1959 |
| 2,927,649 | Poynor et al. | Mar. 8, 1960 |
| 2,947,299 | Shallenberg et al. | Aug. 2, 1960 |